United States Patent
Yuan et al.

(10) Patent No.: US 6,205,245 B1
(45) Date of Patent: Mar. 20, 2001

(54) METHOD AND APPARATUS FOR RAPID DOWN-SCALING OF COLOR IMAGES DIRECTLY FROM SENSOR COLOR FILTER ARRAY SPACE

(75) Inventors: Po Yuan, Chandler; Thomas C. Jones; Karen Pigott, both of Phoenix, all of AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/123,498

(22) Filed: Jul. 28, 1998

(51) Int. Cl.[7] .............................. G06K 9/00; G06K 9/32; G06K 9/36; H04N 1/46
(52) U.S. Cl. ........................ 382/162; 382/286; 382/299; 358/515; 358/528
(58) Field of Search .................................... 382/298, 299, 382/286, 162, 167, 300, 165, 164, 166; 358/528, 515, 518

(56) References Cited

U.S. PATENT DOCUMENTS

| | | | |
|---|---|---|---|
| 5,778,158 | * 7/1998 | Fujii et al. | 395/102 |
| 5,838,838 | * 11/1998 | Overton | 382/298 |
| 5,901,254 | * 5/1999 | Iguchi et al. | 382/298 |
| 5,995,682 | * 11/1999 | Pawlicki et al. | 382/300 |

* cited by examiner

*Primary Examiner*—Joseph Mancuso
*Assistant Examiner*—Yosef Kassa
(74) *Attorney, Agent, or Firm*—Blakely, Sokoloff, Taylor & Zafman LLP

(57) ABSTRACT

A method for downscaling an image from a sensor color filter array space having the step of determining an initial image size. The method also has steps of determining a set of stride lengths, locating a single color pixel of interest, and generating a full color pixel. An apparatus having a processor and a memory coupled to the processor for performing the above steps is also disclosed.

21 Claims, 4 Drawing Sheets

METHOD AND APPARATUS FOR RAPID DOWN-SCALING OF COLOR IMAGES DIRECTLY FROM SENSOR COLOR FILTER ARRAY SPACE

BACKGROUND

This invention is related to operations on digital images. Specifically, the invention provides a method and apparatus for generating down-scaled digital images directly from a color filter array space.

DESCRIPTION OF BACKGROUND

Digital photography, which is the use of digital cameras that store image information with a series of ones and zeros, is rapidly replacing traditional film-based photography in many areas.

For digital cameras, it is often desirable to allow the "previewing" of a scene before an image is captured. This preview allows a user to determine, for example, whether a subject to be captured is centered or the scene is framed properly before processing is wasted in capturing an unwanted image. In the alternative, digital cameras may also provide a "thumbnail" (e.g., a smaller preview version of an image) after an image has been captured, to allow the user to determine whether to keep the image and before resources are utilized in transferring the full amount of data for an image from the camera to an output device, such as a printer or a computer for display. Unlike traditional film-based cameras, a user does not have to wait until negatives have been processed to see a close approximation of a captured image. Thus, resources such as power, storage, and time may be saved when a user can preview a picture.

In one approach to providing image preview before capture, a miniature display, such as a liquid crystal display (LCD), is built into the digital camera to allow the preview of scenes before an image is captured. For providing a preview of images before they are transferred to an output device, such as a printer or a host computer, a smaller version is usually created. This down scaled version of the image is transferred instead of the originally captured version of the image, as the original image is larger in size and takes more time to transfer.

Typically, color images are captured by using an array of light sensitive photodiodes, termed a color filter array (CFA). Each diode is sensitive to one color, such as red, green or blue. To compose a single color pixel, the values of at least one captured cluster of red, green, and blue values are combined. Once a set of color pixels is created from the values of the CFA that represents an image, separate color planes (e.g., the individual red, green, and blue color planes) may be generated to represent the image.

However, in order to down scale a color image, the original image data, which is captured in the format of the CFA space, is converted into a representation that is compatible with existing down scaling processes, such as separate red, green, and blue image planes. This adds an additional step and employs additional processing resources.

As image down scaling is a common task for the purposes of thumbnail generation for preview and review, and saving storage space, it is desirable to have a down scaling system that is efficient and allows the rapid processing of images from the CFA level.

SUMMARY

What is disclosed, in one embodiment, is a method that includes determining an initial image size. The method also includes determining a set of stride lengths, locating a single color pixel of interest, and generating a full color pixel. An apparatus having, in one embodiment, a processor and a memory coupled to the processor for performing the above method is also disclosed.

DETAILED DESCRIPTION

Embodiments of the present invention provide a method and apparatus for rapid down-scaling of color images directly from sensor color filter array (CFA) space. For purposes of explanation, specific embodiments are set forth to provide a thorough understanding of the present invention. However, it will be understood by one skilled in the art, from reading this disclosure, that the invention may be practiced without these details. Further, although the present invention is described through the use of digital cameras and specific color spaces, most, if not all, aspects of the invention apply to digital imaging devices and color spaces in general. Moreover, well-known elements, devices, process steps and the like are not set forth in detail in order to avoid obscuring the present invention.

Embodiments of the present invention operate on image data that is in sensor CFA space and interpolate only the data necessary to arrive at a downscaled image. In one embodiment, one full color pixel that is in red, green, and blue (RGB) space is generated from image data that is in a Bayer's pattern CFA space.

Figure 1:
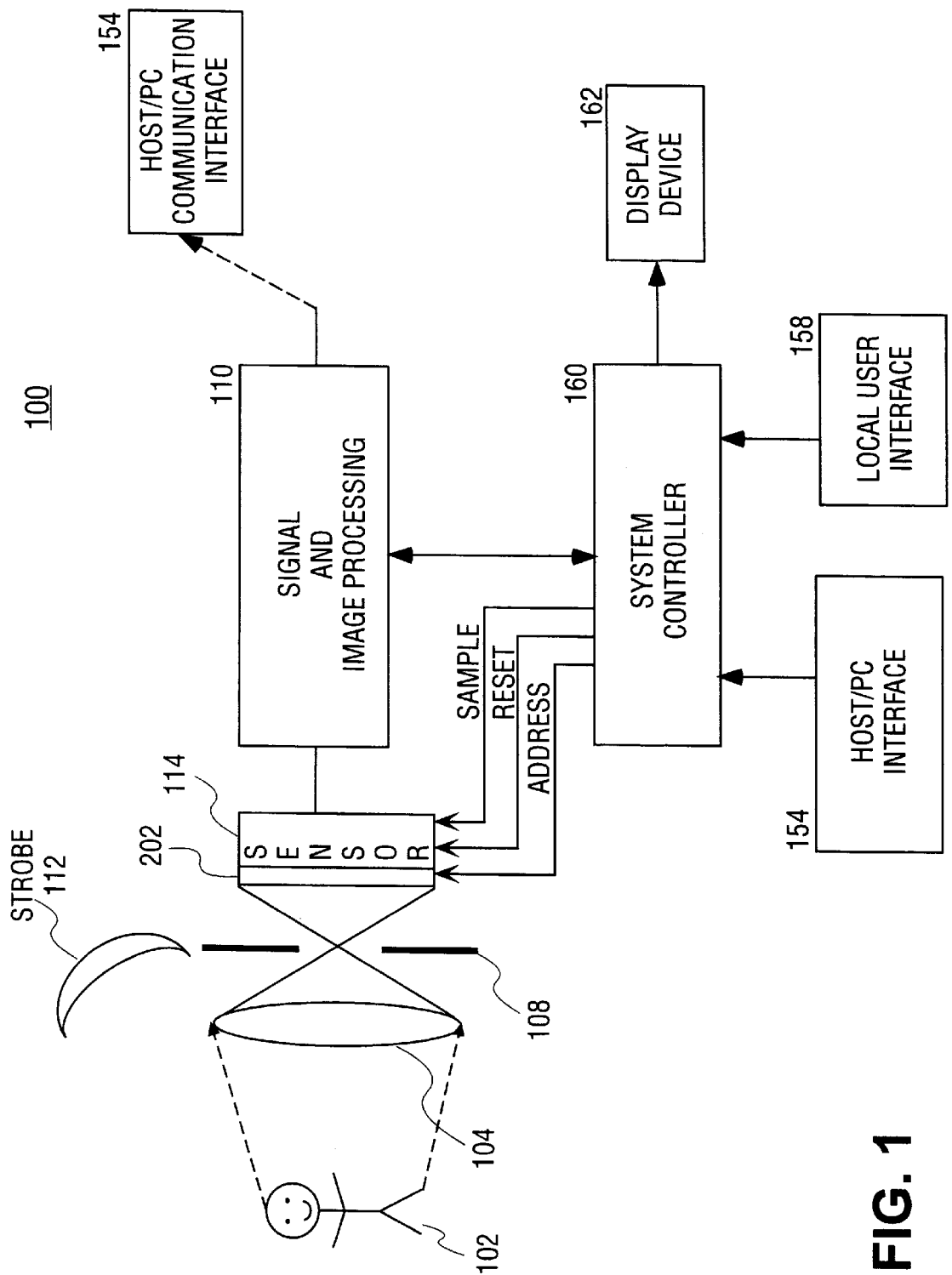
FIG. 1 is a block diagram of an image capture device configured in accordance with one embodiment of the present invention.

An embodiment of the invention such as an imaging system 100 is shown as a logical block diagram in FIG. 1. Imaging system 100 includes a number of conventional elements, such as an optical system having a lens 104 and aperture 108 that is exposed to the incident light reflected from a scene or object 102. The optical system properly channels the incident light towards a sensor array 114 that generates sensor signals in response to an image of object 102 being formed on sensor array 114. Sensor array 114 contains a color filter array (CFA) 202 that is used to provide single color detecting capability to sensor array 114, as discussed below.

The various control signals used in the operation of sensor array 114, such as the RESET signal, the SAMPLE signal, and the ADDRESS signal, are generated by a system controller 160. System controller 160 may include a microcontroller or a processor with input/output (I/O) interfaces that generates the control signals in response to instructions stored in a memory such as a non-volatile programmable memory. Alternatively, a logic circuit that is tailored to generate the control signals with proper timing may be used. System controller 160 also acts in response to user input via a local user interface 158 (as when a user pushes a button or turns a knob of system 100) or a host/PC interface 154 to manage the operation of imaging system 100.

To obtain compressed and/or scaled images, a signal and image processing unit 110 is provided in which hardware and software operates according to image processing methodologies to generate image data with a predefined resolution in response to receiving the sensor signals. Signal and image processing unit 110 is further described in connection with FIG. 3, below.

Optional storage devices (not shown) can be used aboard system 100 for storing image data. Such local storage devices may include a removable memory card or a magnetic media device. For example, a magnetic tape drive or magnetic disc drive may be used to store image data. In addition, these storage devices may be used to store program or other data in addition to image data, which may be used by imaging system 100.

A host/personal computer (PC) communication interface 154 may be included for transferring image data to an image processing and/or viewing system, such as a computer system separate from imaging system 100. For example, a connection may be established using a standard serial bus protocol between imaging system 100 and the optional personal computer system. It is to be noted that image data may also be transferred (e.g., "downloaded") from the personal computer system.

Imaging system 100 also contains a display device 162 for displaying image data. In one embodiment, where imaging system 100 comprises a portable digital camera, display device 162 may be a liquid crystal display (LCD) or other suitable low power display for showing image data. In another embodiment, display device 162 is detachable from imaging system 100 and may be a separate display device, such as a television monitor or a computer display monitor. Display device 162 may also be used to display control and other system information along with image data, thereby reducing the desire for a separate display for system status (e.g., a separate LCD for such indicators as battery level, remaining number of exposures, and time/date information).

Figure 2:
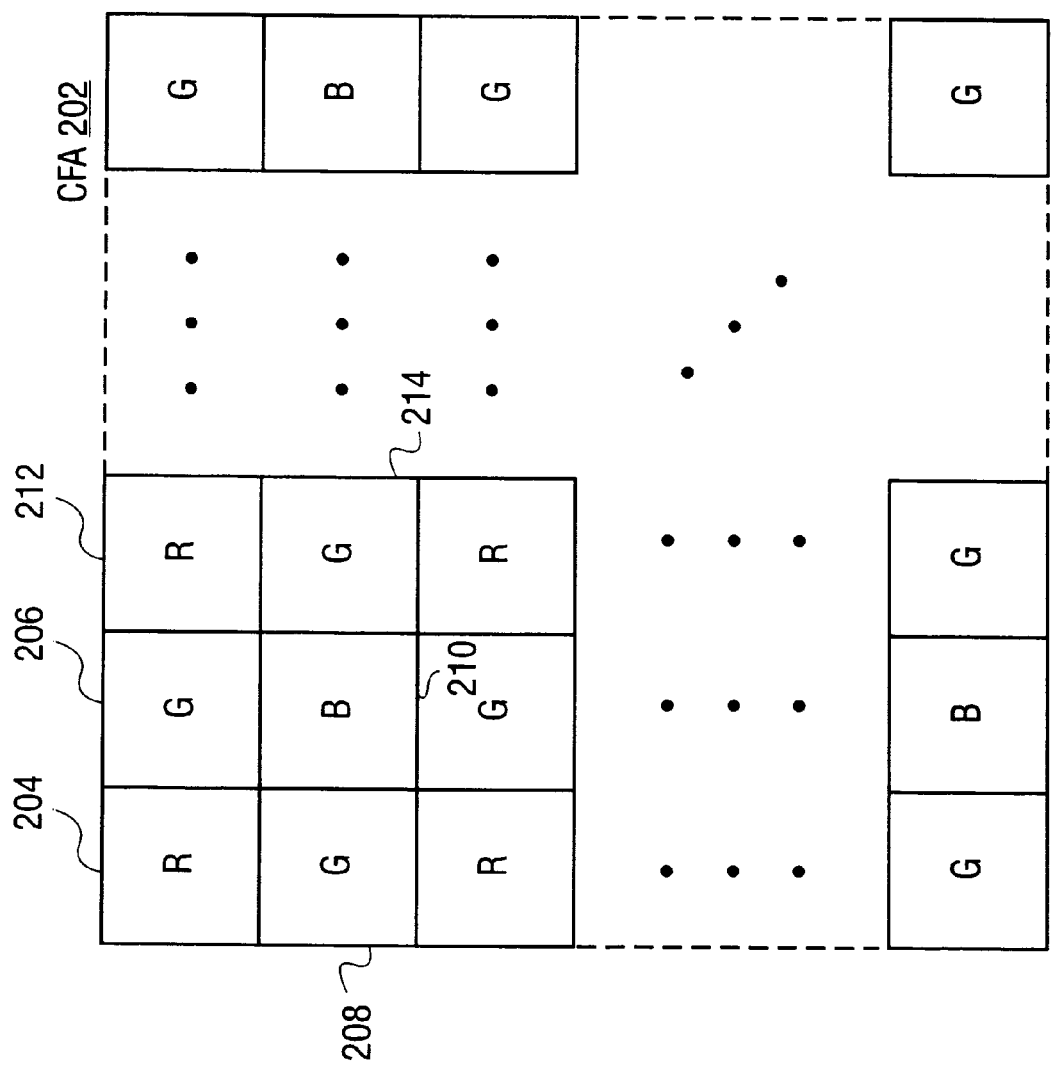
FIG. 2 is a schematic diagram of a color filter array contained in the device illustrated in FIG. 1 that is configured in accordance with one embodiment of the present invention.

FIG. 2 is a diagram of CFA 202 showing a layout of color filters for the sensors contained in sensor array 114 in a pattern called Bayer's pattern. The use of CFA 202 allows each pixel sensor in sensor array 114 to be sensitive to one color—e.g., CFA 202 may be used to create an array of "single color" pixel sensors. In one embodiment, each pixel sensor is made to be sensitive to light that is substantially in either the red color light spectrum, the green color light spectrum, or the blue color light spectrum. To form an image composed of full color pixels, where each full color pixel may represent one color in the full color light spectrum, the single color light values from a cluster of single color pixel sensors are combined to give each full color pixel a red color intensity value, a green color intensity value, and a blue color intensity value.

In one embodiment, one cluster is composed of four single color pixel sensors. For example, a red pixel sensor 204, a first green pixel sensor 206, a second green pixel sensor 208, and a blue pixel sensor 210 make up one cluster. The values from these single color pixel sensors are combined to obtain one full color pixel. In addition, a full color pixel may be constructed by using first green pixel sensor 206, a second red pixel sensor 212, blue pixel sensor 210, and third green pixel sensor 214. Thus, a cluster is composed of the RGB color values from four adjacent single color pixel sensors.

As discussed above, each of the color pixel sensors in CFA 202 are responsive to only one color in this embodiment. For example, a red pixel sensor such as red pixel sensor 204 would only be responsive to light which is substantially in the red color spectrum, which is electromagnetic radiation in the wavelength range of approximately 580 to 690 nanometers. Similarly, for a green pixel sensor such as first green pixel sensor 206, the light that is measured is substantially in the green color spectrum, which is electromagnetic radiation in the wavelength range of approximately 500 to 580 nanometers. For a blue pixel sensor such as blue pixel sensor 210, the light that is measured is substantially in the blue color spectrum, which is electromagnetic radiation in the wavelength range of approximately 430 to 500 nanometers.

Figure 3:
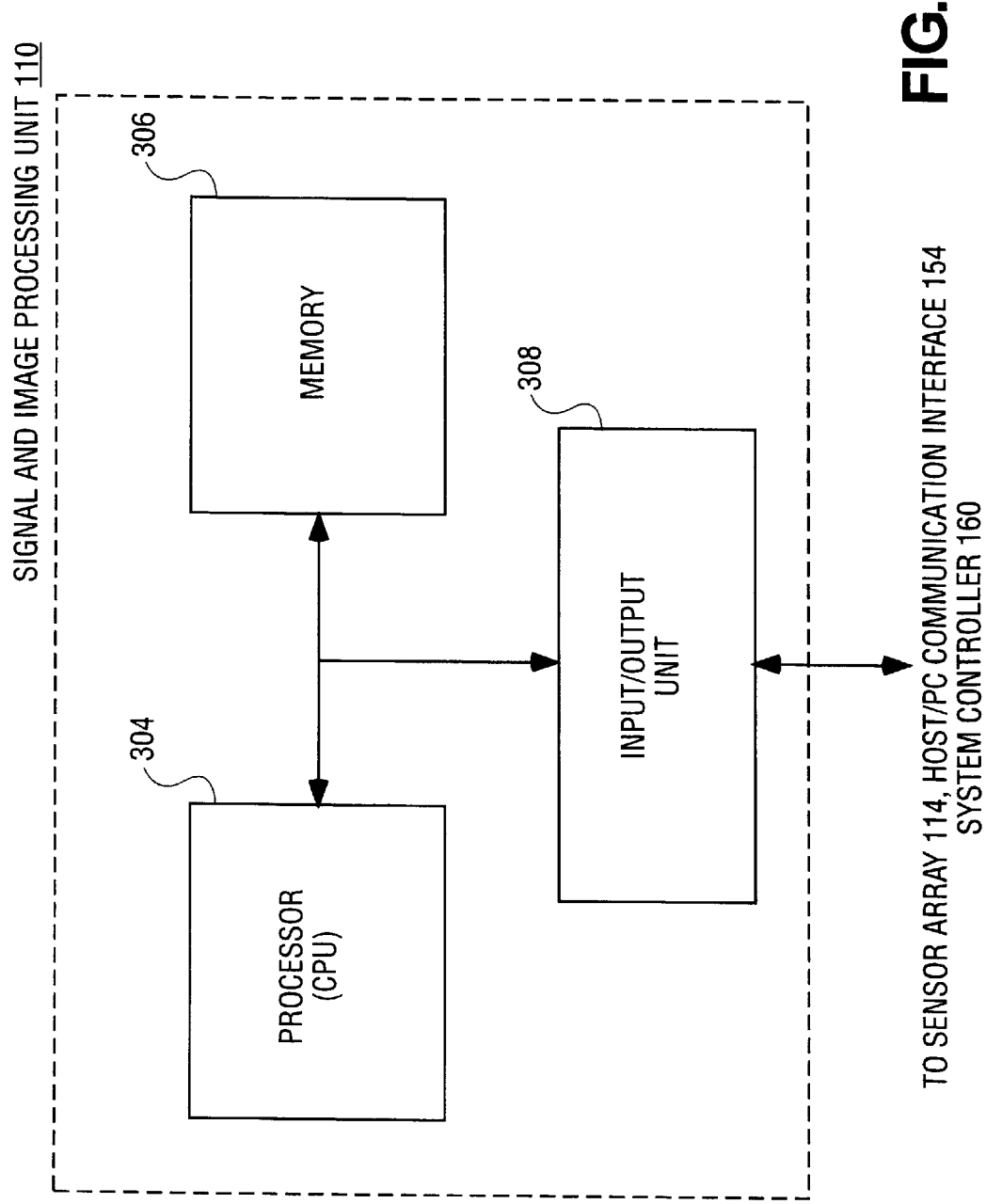
FIG. 3 is a block diagram of a signal and image processing unit contained in the image capture device of FIG. 1 that is configured in accordance with one embodiment of the present invention.

FIG. 3 is a block diagram of signal and image processing unit 110 containing a microprocessor 304, a memory 306, and an input/output unit 308. Microprocessor 304 may be a general purpose processor such as those manufactured by the Intel Corporation, or an application specific integrated circuit (ASIC) which is designed purely to work as a digital signal processor. Also, memory 306 may be a non-volatile memory, a volatile memory, or a combination of the two types of memory, as desired for the operation of processor 304. Input/output unit 308 is used to send and receive information with sensor 114, host/PC communication interface 154, and system controller 160.

In one embodiment, sensor array 114 provides analog-to-digital conversion of the captured signals such that signal and imaging processing unit 110 receives the individual captured values of each single color pixel sensor in a digital format. In another embodiment, sensor array 114 provides analog signals to signal and image processing unit 110, which performs digital-to-analog signal conversion on the captured pixel signals. In addition, functions such as correlated double sampling may be performed by either unit.

Figure 4:
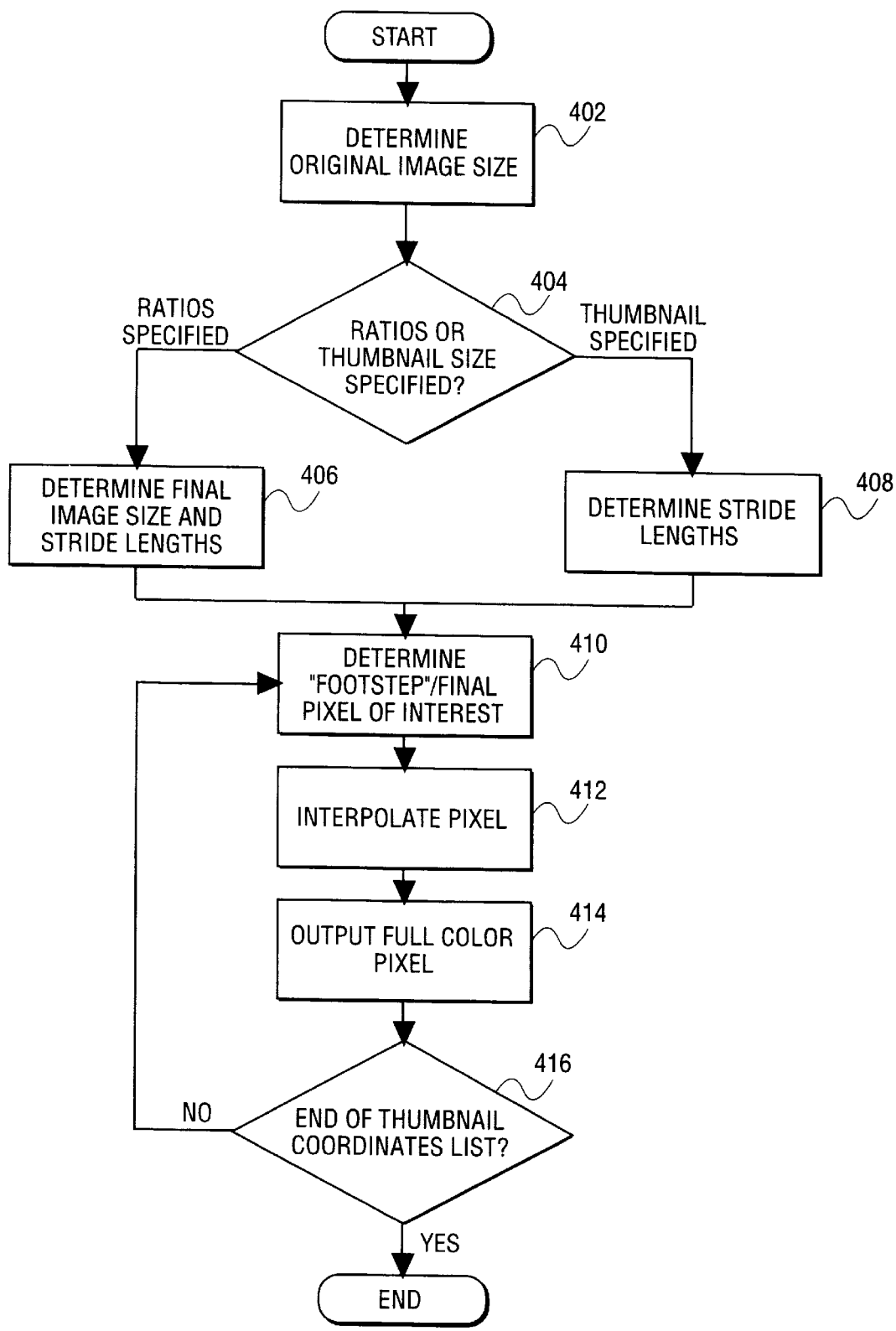
FIG. 4 is a flow diagram of the operation of the image scale-down unit of FIG. 3.

FIG. 4 is flow diagram of the operation of signal and image processing unit 110 in the generation of down-scaled images from CFA space to a color-space, such as RGB or cyan, magenta, yellow, and black (CMYK).

Operation begins with block 402, where the size of the original image is determined. This determination provides the initial dimensions of the original image, used to generate the final downscaled images (e.g., thumbnails). In one embodiment, the dimensions (e.g., height and width) of the original image are known as the dimensions of sensor array 114 are known. If sensor array 114 can be used to capture images in a different size using, for example, hardware scaling, then the dimensions of the image captured by sensor array 114 is determined in block 402.

In block 404, it is determined whether a set of downscaling ratios or a final thumbnail image size is specified to signal and image processing unit 110. The source of the specification may be from the system or the user. In one embodiment, the system provides the final thumbnail image size to signal and image processing unit 110 as the system uses a predefined image size for thumbnails images on display device 162. In another embodiment, the user specifies a set of downscaling ratios to determine the size of the final thumbnail image.

As an example, in cases where a set of downscaling ratios are used, it may be composed of two ratios, one ratio for the horizontal dimension and one ratio for the vertical dimension of the thumbnail image. These ratios represent reduction factors from the original image size to the thumbnail image size.

If a set of ratios are specified, then operation continues with block 406. Otherwise, if a final thumbnail size is specified, then operation continues with 408.

In block 406, a set of downscaling ratios for both the horizontal axis and the vertical axis have been specified with respect to the image to be downscaled. From the set of ratios, signal and image processing unit 110 determines a final thumbnail image size. In one embodiment, signal and image processing unit 110 determines a final thumbnail image size by dividing the dimensions of the original image by the set of downscaling ratios. For example, an original horizontal image size 640 is divided by a horizontal downscaling ratio of 10, resulting the thumbnail horizontal size of 64. Similarly, the original vertical image size is divided by a vertical downscaling ratio.

Horizontal and vertical stride lengths, which are the number of pixels to skip in the downscaling process, also may be determined in block 406. In cases where the downscaling ratios are known, the stride lengths are equal to the corresponding downscaling ratios. For example, given a 4-to-1 horizontal downscaling ratio, the stride length is 4, which means that every other 4 horizontal pixels are chosen to construct the final downscaled thumbnail image.

In block 408, a final thumbnail image size has been specified. Signal and image processing unit 110 then calculates a set of stride lengths. In one embodiment, a horizontal stride length is calculated by dividing the original horizontal image size by the final thumbnail horizontal image size. Also, an original vertical image size is divided by the final thumbnail vertical image size to arrive at a vertical stride length.

In block 410, signal and image processing unit 110 determines the coordinates of a pixel of interest on the original image (e.g., a "footstep" pixel in the original image is determined). As the original image is in CFA space, the pixel of interest is a single color pixel (e.g., a red color pixel, a green color pixel, or a blue color pixel). Operation then continues with block 412.

In block 412, a full color pixel value is generated by interpolating the single color pixel values surrounding the pixel of interest. In one embodiment, the color components of the full color pixel corresponding to the color component value provided by the footstep pixel—either the red color component, green color component, or blue color component—is set to the color value of the footstep pixel. For example, if the footstep pixel is a red color pixel, then the red component of the full color pixel will be set to the value of the footstep pixel (e.g., the red component is set to the value of the footstep pixel, which is a red color pixel). Similarly, if the footstep pixel is a green color pixel, then the green component of the full color pixel will be set to the value of the footstep pixel (e.g., the green component is set to the value of the footstep pixel, which is a green color pixel).

After the first color component of the full color pixel is assigned, the remaining color components of the full color pixel are assigned the values of the surrounding single color pixels. For example, if the footstep pixel is a red color pixel, then the blue component of the full color pixel is set to be the value of its cluster blue color pixel and the green component of the full color pixel is set to be the value of its cluster color pixel.

In block 414, the color value of the full color pixel is output along with its coordinates for its placement in the thumbnail image. In one embodiment, the data for the full color pixel is stored in memory 306 for output over input/output unit 308 once the thumbnail image has been completely generated. In another embodiment, data for the full color pixel is output over input/output unit 308 as the data is being generated.

In block 416, signal and image processing unit 110 determines whether the last pixel of the thumbnail image has been generated. If the last pixel of the thumbnail image has not been generated, then operation will return to block 410, where signal and image processing unit 110 continues to process and generate the next full color pixel for the thumbnail image. In one embodiment, as discussed above, the thumbnail image is transferred out of signal and image processing unit 110 after the end of the thumbnail coordinates list has been reached.

Continuing with the description of block 416, if the last pixel of the thumbnail image has been generated, then operations will end.

In one embodiment, the above flow diagram is implemented as a series of instructions executed on 304. Thus, where:

W: width of original image in CFA space;

H: height of original image in CFA space;

$W_s$: width of downscaled image in RGB color space;

$H_s$: height of downscaled image in RGB color space;

CFA[x,y]: returns the value of a single color pixel given an x coordinate and a y coordinate the single color pixel in the CFA space;

CFA_Color(x,y): returns an enumerated value of {R, G1, B, G2} corresponding to color of the single color pixel (e.g., R=red pixel, G1=first green pixel, and B=blue pixel) given an x coordinate and a y coordinate the single color pixel in the CFA space;

StrideX: horizontal stride length defined to be $W/W_s$;

StrideY: vertical stride length defined to be $H/H_s$;

RED[$X_s,Y_s$]: output of red color component value of a full color pixel of the thumbnail image with an $X_s$ coordinate and a $Y_s$ coordinate;

GREEN[$X_s,Y_s$]: output of green color component value of the full color pixel of the thumbnail image with an $X_s$ coordinate and a $Y_s$ coordinate; and, BLUE[$X_s,Y_s$]: output of blue color component value of the full color pixel of the thumbnail image with an $X_s$ coordinate and a $Y_s$ coordinate;

and where an embodiment of the pseudo-code of the image downscaling algorithm for downscaling an image in a CFA space configured in a Bayer's pattern may be:

```
{
    y = Ys * StrideY + (StrideY/2);
    for(Xs = 0; Xs < Ws; Xs++)
    {
        X = Xs * StrideX + (StrideX/2);
        switch (CFA_Color(x,y))
        {
            case R:
                RED[Xs,Ys] = CFA[x,y];
                GREEN[Xs,Ys] = CFA[x+1,y];
                BLUE[Xs,Ys] = CFA[x+1,y+1];
                break;
            case G1:
                GREEN[Xs,Ys] = CFA[x,y];
                RED[Xs,Ys] = CFA[x-1,y];
                BLUE[Xs,Ys] = CFA[x,y+1];
                break;
            case B:
                BLUE[Xs,Ys] = CFA[x,y];
                GREEN[Xs,Ys] = CFA[x-1,y];
                RED[Xs,Ys] = CFA[x-1,y-1];
                break;
            case G2:
```

-continued

```
            GREEN[X_s,Y_s] = CFA[x,y];
            RED[X_s,Y_s] = CFA[x,y-1];
            BLUE[X_s,Y_s] = CFA[x+1,y];
            break;
      } #End switch#
   } #End x loop#
} #End y loop#
```

It is to be noted that although the pseudo-code above is applied to an image that is in a CFA space configured in a Bayer's pattern, one of ordinary skill in the art may modify the pseudo-code of the present invention to apply to an image that is in a CFA space configured in other patterns, such as cyan, magenta, yellow and green (CMYG).

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

What is claimed is:

1. A color image reduction method comprising:
   determining an initial image size of an image;
   determining a set of stride lengths based on said initial image size and a final image size;
   locating a single color pixel of interest on said image using said set of stride lengths; and
   generating a full color pixel based on single color pixel values of (1) said single color pixel of interest and (2) at least two pixels adjacent to said single color pixel of interest, wherein a reduced image is formed by repeating the locating of a single color pixel of interest to locate a subsequent single color pixel of interest and generating a full color pixel corresponding to said subsequent single color pixel of interest.

2. The method of claim 1, wherein determining said initial image size comprises:
   determining an initial image horizontal size; and,
   determining an initial image vertical size.

3. The method of claim 1, wherein determining said set of stride lengths comprises:
   generating a horizontal stride length; and,
   generating a vertical stride length.

4. The method of claim 3, wherein generating said horizontal stride length comprises dividing an initial image horizontal size by a final image horizontal size.

5. The method of claim 3, wherein generating said vertical stride length comprises dividing an initial image vertical size by a final image vertical size.

6. The method of claim 1, wherein locating said single color pixel of interest comprises:
   generating a horizontal coordinate of said single color pixel using a multiple of a horizontal stride length of said set of stride lengths; and,
   generating a vertical coordinate of said single color pixel using a multiple of a vertical stride length of said set of stride lengths.

7. The method of claim 1, wherein generating said full color pixel comprises:
   determining an enumerated value corresponding to the color of said single color pixel of interest;
   setting a first color value of said full color pixel to a color value of said single color pixel;
   setting a second color value of said full color pixel to a second color value of a second single color pixel adjacent to said single color pixel; and,
   setting a third color value of said full color pixel to a third color value of a third single color pixel adjacent to said single color pixel.

8. A color image reduction apparatus comprising;
   a machine readable medium containing instructions which, when executed by a machine, cause the machine to perform operations comprising:
   determine an initial image size of an image;
   determine a set of stride lengths based on said initial image size and a final image size;
   locate a plurality of single color pixels of interest on said image using said set of stride lengths; and
   generate prior to processing of color interpolation a full color pixel for each of said plurality of single color pixels of interest based on single color pixel values of (1) a corresponding single color pixel of interest and (2) at least two color pixels adjacent to said corresponding single color pixel of interest.

9. The apparatus of claim 8, where said machine readable medium is further configured to cause said machine to:
   determine an initial image horizontal size; and,
   determine an initial image vertical size.

10. The apparatus of claim 8, where said machine readable medium is further configured to cause said machine to:
    generate a horizontal stride length; and,
    generate a vertical stride length.

11. The apparatus of claim 10, where said machine readable medium is further configured to cause said machine to divide an initial image horizontal size by a final image horizontal size.

12. The apparatus of claim 10, where said machine readable medium is further configured to cause said machine to divide an initial image vertical size by a final image vertical size.

13. The apparatus of claim 8, where said machine readable medium is further configured to cause said machine to:
    generate a horizontal coordinate of said single color pixel using a multiple of a horizontal stride length of said set of stride lengths; and,
    generate a vertical coordinate of said single color pixel using a multiple of a vertical stride length of said set of stride lengths.

14. The apparatus of claim 13, where said machine readable medium is further configured to cause said machine to:
    determine an enumerated value corresponding to the color of said single color pixel of interest;
    set a first color value of said full color pixel to a color value of said single color pixel;
    set a second color value of said full color pixel to a second color value of a second single color pixel adjacent to said single color pixel; and,
    set a third color value of said full color pixel to a third color value of a third single color pixel adjacent to said single color pixel.

15. A color image reduction system comprising:
    an image sensor;
    a processor coupled to said image sensor;
    a memory coupled to said processor and configured to cause said processor to:
    determine an initial image size of an image captured by said image sensor;

determine a set of stride lengths based on said initial image size and a final image size;

locate a plurality of single color pixels of interest on said image using said set of stride lengths; and generate prior to processing of color interpolation a full color pixel for each of said plurality of single color pixels of interest based on single color pixel values of (1) a corresponding single color pixel of interest and (2) at least two color pixels adjacent to said corresponding single color pixel of interest.

16. The image system of claim 15, where said memory is further configured to cause said processor to:

determine an initial image horizontal size; and, determine an initial image vertical size.

17. The image system of claim 15, where said memory is further configured to cause said processor to:

generating a horizontal stride length; and, generating a vertical stride length.

18. The image system of claim 17, where said memory is further configured to cause said processor to divide an initial image horizontal size by a final image horizontal size.

19. The image system of claim 17, where said memory is further configured to cause said processor to divide an initial image vertical size by a final image vertical size.

20. The image system of claim 15, where said memory is further configured to cause said processor to:

generate a horizontal coordinate of said single color pixel using a multiple of a horizontal stride length of said set of stride lengths; and, generate a vertical coordinate of said single color pixel using a multiple of a vertical stride length of said set of stride lengths.

21. The image system of claim 20, where said memory is further configured to cause said processor to:

determine an enumerated value corresponding to the color of said single color pixel of interest;

set a first color value of said full color pixel to a color value of said single color pixel;

set a second color value of said full color pixel to a second color value of a second single color pixel adjacent to said single color pixel; and, set a third color value of said full color pixel to a third color value of a third single color pixel adjacent to said single color pixel.

\* \* \* \* \*